(12) United States Patent
Li et al.

(10) Patent No.: US 11,323,220 B2
(45) Date of Patent: May 3, 2022

(54) WIRELESS COMMUNICATION METHOD AND APPARATUS

(71) Applicant: HUAWEI TECHNOLOGIES CO., LTD., Shenzhen (CN)

(72) Inventors: Zhenyu Li, Beijing (CN); Yang Nan, Beijing (CN); Wurong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 16/805,039

(22) Filed: Feb. 28, 2020

(65) Prior Publication Data
US 2020/0220682 A1 Jul. 9, 2020

Related U.S. Application Data

(63) Continuation of application No. PCT/CN2017/099804, filed on Aug. 31, 2017.

(51) Int. Cl.
*H04L 5/00* (2006.01)
*H04W 48/16* (2009.01)
*H04W 48/18* (2009.01)
*H04W 74/08* (2009.01)

(52) U.S. Cl.
CPC .......... *H04L 5/0048* (2013.01); *H04L 5/0012* (2013.01); *H04W 48/16* (2013.01); *H04W 48/18* (2013.01); *H04W 74/0808* (2013.01)

(58) Field of Classification Search
CPC combination set(s) only.
See application file for complete search history.

(56) References Cited

U.S. PATENT DOCUMENTS

| | | | |
|---|---|---|---|
| 2016/0227571 A1* | 8/2016 | Baek | H04W 48/20 |
| 2016/0234763 A1 | 8/2016 | Um et al. | |
| 2016/0309468 A1 | 10/2016 | Chen et al. | |
| 2018/0062806 A1* | 3/2018 | Jung | H04L 5/0091 |
| 2018/0115967 A1* | 4/2018 | Ahn | H04W 72/042 |
| 2018/0213561 A1* | 7/2018 | Bhorkar | H04W 74/0808 |
| 2018/0220459 A1* | 8/2018 | Park | H04W 74/08 |

(Continued)

FOREIGN PATENT DOCUMENTS

| | | |
|---|---|---|
| CN | 103702341 A | 4/2014 |
| CN | 105634700 A | 6/2016 |

(Continued)

OTHER PUBLICATIONS

MulteFire Alliance: "MulteFire Release 1.0 Technical Paper. A New Way to Wireless" Jan. 20, 2017 (Jan. 20, 2017), pp. 1-25. XP055446360.

(Continued)

*Primary Examiner* — Yee F Lam
(74) *Attorney, Agent, or Firm* — Hauptman Ham, LLP

(57) ABSTRACT

A method includes determining, by a network side device, N fixed channels. The method further includes determining, by the network side device, a first fixed channel from the N fixed channels, sending, by the network side device, a discovery reference signal on the first fixed channel, and performing data transmission on a data channel through frequency hopping. The data channel includes a channel other than the N fixed channels. N is an integer greater than or equal to 2.

20 Claims, 8 Drawing Sheets

(56) References Cited

U.S. PATENT DOCUMENTS

| | | | |
|---|---|---|---|
| 2018/0309479 A1* | 10/2018 | Yerramalli | ............ H04L 5/0012 |
| 2018/0368105 A1* | 12/2018 | Frederiksen | .......... H04W 48/10 |
| 2019/0044676 A1* | 2/2019 | Li | ..................... H04W 74/0808 |
| 2019/0069228 A1* | 2/2019 | Malik | ..................... H04L 5/005 |
| 2019/0215110 A1* | 7/2019 | Yang | ..................... H04W 76/27 |
| 2020/0029392 A1* | 1/2020 | Ye | ......................... H04W 88/10 |
| 2021/0058206 A1* | 2/2021 | Ye | ......................... H04L 5/0012 |

FOREIGN PATENT DOCUMENTS

| | | | | |
|---|---|---|---|---|
| CN | 106161292 A | 11/2016 | | |
| CN | 106304091 A | 1/2017 | | |
| CN | 106559880 A | 4/2017 | | |
| CN | 107046724 A | 8/2017 | | |
| EP | 3355635 A1 | 8/2018 | | |
| WO | 2016019555 A1 | 2/2016 | | |
| WO | 2017026980 A1 | 2/2017 | | |
| WO | 2017136677 A1 | 8/2017 | | |
| WO | 2018195022 A1 | 10/2018 | | |
| WO | WO-2018191538 A1 * | 10/2018 | ............ | H04W 48/10 |
| WO | 2018204629 A1 | 11/2018 | | |

OTHER PUBLICATIONS

Extended European Search Report issued in corresponding European Patent Application No. 17923967.8, dated Jul. 7, 2020, pp. 1-10, European Patent Office, Munich, Germany.

3GPP TS 36.211 V1.2.0:"3rd Generation Partnership Project; Technical Specification Group Radio Access Network; Physical Channels and Modulation(Release 8)",Jun. 2007,total 43 pages.

3GPP TS 36.213 V1.2.0:"3rd Generation Partnership Project; Technical Specification Group Radio Access Network; Physical layer procedures(Release 8)",May 2007,total 10 pages.

3GPP TS 36.300 V8.1.0:3rd Generation Partnership Project;Technical Specification Group Radio Access Network Evolved Universal Terrestrial Radio Access (E-UTRA) and Evolved Universal Terrestrial Radio Access Network (E-UTRAN);Overall description;Stage 2 (Release 8), Jun. 2007, total 106 pages.

International search report dated May 24, 2018 from corresponding application No. PCT/CN2017/099804.

Chinese Office Action issued in corresponding Chinese Application No. 201780092361.5, dated Jun. 28, 2021, pp. 1-6.

* cited by examiner

| | Sending time window | | | | | | | | |
|---|---|---|---|---|---|---|---|---|---|
| Channel 1 | DRS | | | DRS | | | DRS | | |
| Channel 2 | | | | | | | | | |
| Channel 3 | DRS | | | DRS | | | DRS | | |
| Channel 4 | | | | | | | | | |
| Channel 5 | DRS | | | DRS | | | DRS | | |
| Channel 6 | | | | | | | | | |
| Channel 7 | | D | S | U | | | | | |
| Channel 8 | | | | | | | | D | S | U |
| Channel 9 | | | | | D | S | U | | |

FIG. 4

| | | | | | | | | |
|---|---|---|---|---|---|---|---|---|
| Channel 1 | DRS | | | | DRS | | | |
| Channel 2 | DRS | | | | DRS | | | |
| Channel 3 | DRS | | | | DRS | | | |
| Channel 4 | | | | | | | | |
| Channel 5 | | Data | | | | Data | | |
| Channel 6 | | | Data | | | | Data | |
| Channel 7 | | | | Data | | | | Data |
| Channel 8 | | | | Data | | | | Data |
| Channel 9 | | Data | | | | Data | | |

FIG. 5

WIRELESS COMMUNICATION METHOD AND APPARATUS

CROSS-REFERENCE TO RELATED APPLICATIONS

This application is a continuation of International Application No. PCT/CN2017/099804, filed on Aug. 31, 2017, the disclosure of which is hereby incorporated by reference in its entirety.

TECHNICAL FIELD

This application relates to the field of wireless communications technologies, and in particular, to a wireless communication method, a network side device, and an apparatus.

BACKGROUND

With continuous growth of mobile communication data, spectrum resources for wireless communication are increasingly strained, and effective use of an unlicensed spectrum becomes increasingly important.

When a network side device communicates with a user terminal by using the unlicensed spectrum, the network side device needs to send a discovery reference signal (DRS) to assist the user terminal in performing channel estimation or channel sounding. Specifically, in a related technology, when sending a DRS on a fixed channel, the network side device first detects whether the fixed channel is idle. If a detection result is that the fixed channel is idle, it indicates that no other network side device sends a DRS on the fixed channel, and in this case, the node device may send the DRS. If a detection result is that the fixed channel is not idle, the network side device detects again whether the fixed channel is idle after waiting for a period of time.

In a multi-cell scenario, when a plurality of network side devices simultaneously send a DRS, a part of the network side devices always cannot obtain an opportunity of sending a DRS (that is, it is detected for a plurality of consecutive times that a fixed channel is not idle). Consequently, access of a user terminal to the part of the network side devices or data transmission between the user terminal and the part of the network side devices is affected.

SUMMARY

To resolve a problem that in a multi-cell scenario, when a plurality of network side devices simultaneously send a DRS, a part of the network side devices always cannot obtain an opportunity of sending a DRS (that is, it is detected for a plurality of consecutive times that a fixed channel is not idle), and consequently, access of a user terminal to the part of the network side devices or data transmission between the user terminal and the part of the network side devices is affected, embodiments of this application provide a wireless communication method, a network side device, and an apparatus.

According to at least one embodiment, a wireless communication method is provided. The method includes:

determining, by a network side device, N fixed channels based on preconfigured frequencies, where N is an integer greater than or equal to 2; determining a first fixed channel from the N fixed channels, where the first fixed channel is M channels in the N fixed channels, M≤N, and M is a positive integer; sending a DRS on the first fixed channel, where the DRS includes at least one of a synchronization signal, broadcast information, and a system message; and performing data transmission with a user terminal on a data channel through frequency hopping, where the data channel is all or some channels other than the N fixed channels.

According to the method provided in some embodiments of this application, the network side device determines the N fixed channels (where N≥2, and N is an integer) based on the pre-configured frequencies, determines the M first fixed channels from the N fixed channels, sends the DRS on the determined first fixed channels, and performs data transmission with the user terminal on the other data channels than the N fixed channels through frequency hopping. In other words, in some embodiments of this application, a plurality of fixed channels may be used by the network side device to send the DRS, and the network side device may select one or more fixed channels from the plurality of fixed channels to send the DRS. Compared with a case in which all network side devices send a DRS on only one fixed channel, in a multi-cell scenario, according to the solution shown in some embodiments of this application, the network side device has more opportunities of sending the DRS, thereby improving access efficiency of the user terminal to the network side device and data transmission efficiency between the user terminal and the network side device, and improving a system capacity.

In some embodiments, some embodiments, the network side device performs UE specific (UE specific) data transmission with the user terminal on the data channel.

In some embodiments, some embodiments, the performing, by the network side device, data transmission with a user terminal on a data channel through frequency hopping includes: performing, by the network side device between two consecutive times for sending the DRS, data transmission with the user terminal on p data channels for a predetermined time length for at least one time, where p≥1, and p is an integer; and when p is not less than 2, time intervals in which data transmission is performed on the p data channels are different.

In some embodiments, some embodiments, the performing, by the network side device between two consecutive times for sending the DRS, data transmission with the user terminal on p data channels for a predetermined time length for at least one time includes: performing, by the network side device, a clear channel assessment (CCA) on the first data channel each time before performing data transmission on the first data channel for the predetermined time length, where the first data channel is any of the p data channels; and performing, by the network side device, data transmission on the first data channel for the predetermined time length if an assessment result of the CCA indicates that the first data channel is idle.

According to the method provided in at least this embodiment, before performing data transmission with the user terminal, the network side device first performs the CCA on the data channel, and then performs data transmission when the assessment result of the CCA indicates that the data channel is idle. This avoids interference generated because data is simultaneously sent on a same channel, and data transmission efficiency and quality are improved.

In some embodiments, the sending, by the network side device, a DRS on the first fixed channel includes: sending, by the network side device, the DRS on the first fixed channel in one sending time window, where the sending time window is a time interval for sending the DRS.

In some embodiments, before the sending, by the network side device, the DRS on the first fixed channel in one sending time window, the method further includes: performing a CCA on the first fixed channel in the sending time window; calculating, by the network side device, a first remaining time length in the sending time window when an assessment result of the CCA indicates that the first fixed channel is occupied; and re-performing, by the network side device, the CCA on the first fixed channel when the first remaining time length is not less than a sum of a time length for performing the CCA for one time and a time length for sending the DRS for one time; and the sending, by the network side device, the DRS on the first fixed channel in one sending time window includes: sending, by the network side device, the DRS on the first fixed channel when an assessment result of the re-performed CCA indicates that the first fixed channel is idle.

In some embodiments, before sending the DRS, the network side device determines the sending time window on the first fixed channel, and may perform a plurality of CCAs in the sending time window. When an assessment result of the CCA performed for one time indicates that a channel is occupied, the network side device may continue to perform the CCA in the sending time window, until a remaining time length of the sending time window is insufficient or the DRS has been sent, thereby improving a success rate of sending the DRS.

In some embodiments, the sending, by the network side device, the DRS on the first fixed channel in one sending time window includes: when M≥2, simultaneously performing, by the network side device, a CCA on the first fixed channel in the sending time window; and sending, by the network side device, the DRS on a second fixed channel in the sending time window, where the second fixed channel is the first channel that obtains an assessment result indicating that the channel is idle and that is in the first fixed channel.

In some embodiments, the method further includes: calculating, by the network side device, a second remaining time length in the sending time window after sending the DRS on the second fixed channel; and simultaneously performing, by the network side device, the CCA on other channels than the second fixed channel in the first fixed channel when the second remaining time length is not less than a sum of a time length for performing the CCA for one time and a time length for sending the DRS for one time.

In some embodiments, when there is more than one determined first fixed channel, the network side device may perform the CCA on a plurality of first fixed channels, and send the DRS on a first fixed channel that first obtains an assessment result that is of the CCA and that indicates that the channel is idle. In addition, after the DRS is sent, the step may be repeated on remaining first fixed channels, thereby improving a success rate of sending the DRS.

In some embodiments, the DRS includes start time offset information, and the start time offset information is used to indicate an offset between a start time point of the data transmission performed between the network side device and the user terminal and a start time point or an end time point of the DRS.

In some embodiments, the DRS includes the start time offset information, used to indicate the offset between the start moment of the data transmission and the start moment or the end moment of the DRS, to help the user terminal rapidly determine the start moment of the data transmission, and improve data transmission efficiency.

In some embodiments, the method further includes: when M<N, for a third fixed channel in the first fixed channel, when detecting that the third fixed channel is continuously occupied within a predetermined time period, determining, by the network side device, a new first fixed channel in the N fixed channels, where the new first fixed channel does not include the third fixed channel.

In some embodiments, the method further includes: sending, by the network side device, fixed channel instruction information to the user terminal through a broadcast channel, where the fixed channel instruction information is used to instruct to use a new first fixed channel in a next change period.

In some embodiments, when detecting that a channel is continuously occupied, the network side device may change a new first fixed channel, and instruct the user terminal to use the new first fixed channel in the next change period. Therefore, a success rate of sending the DRS is ensured when some fixed channels are continuously occupied.

In some embodiments, before the sending, by the network side device, the DRS on the first fixed channel, the method further includes: determining, by the network side device, the sending time window based on pre-configured time window configuration information, or determining, by the network side device, the sending time window based on an identifier of a cell that the user terminal accesses.

In some embodiments, the determining, by the network side device, a first fixed channel from the N fixed channels includes: determining, by the network side device, the first fixed channel from the N fixed channels based on preconfigured fixed channel configuration information, or determining, by the network side device, the first fixed channel from the N fixed channels based on an identifier of a cell that the user terminal accesses.

In some embodiments, neighboring cells correspond to a same first fixed channel, and the neighboring cells respectively correspond to different sending time windows. Alternatively, neighboring cells respectively correspond to different first fixed channels.

In some embodiments, the sending, by the network side device, a DRS on the first fixed channel includes: sending, by the network side device, the DRS that includes data channel configuration information on the first fixed channel, where the data channel configuration information indicates duration for uplink transmission and duration for downlink transmission that are in each predetermined time length.

According to the method provided in some embodiments of this application, in a data transmission process, duration for uplink transmission and duration for downlink transmission that are in each predetermined time length may be flexibly configured, thereby improving data transmission flexibility.

According to at least one embodiment a wireless communication method is provided. The method includes: determining, by a user terminal, N fixed channels based on preconfigured frequencies, where N is an integer greater than or equal to 2; detecting, by the user terminal, a first fixed channel in the N fixed channels, where the first fixed channel is M channels in the N fixed channels, M≤N, and M is a positive integer; receiving, by the user terminal, a DRS on the first fixed channel, where the DRS includes at least one of a synchronization signal, broadcast information, and a system message; and performing, by the user terminal, data transmission with a network side device on a data channel through frequency hopping based on the DRS, where the data channel is all or some channels other than the N fixed channels.

In some embodiments, the performing, by the user terminal, data transmission with a network side device on a data channel through frequency hopping based on the DRS includes: calculating, by the user terminal, a start moment of the data channel based on start time offset information included in the DRS, where the start time offset information is used to indicate an offset between a start time point of the data transmission between the network side device and the user terminal and a start time point or an end time point of the DRS; calculating, by the user terminal, a sending frequency of the data channel based on a frequency hopping pattern and frequency hopping time information that are included in the DRS; determining, by the user terminal, an uplink/downlink location on the data channel based on data channel configuration information included in the DRS, where the data channel configuration information indicates duration for uplink transmission and duration for downlink transmission that are in each predetermined time length; and performing, by the user terminal, data transmission with the network side device through frequency hopping based on the start moment, the sending frequency, and the uplink/downlink location of the data channel.

According to at least one embodiment, a communications apparatus is provided. The apparatus has a function of implementing the wireless communication method provided in the first aspect and the possible implementation solutions of the first aspect. The function may be implemented by hardware, or may be implemented by hardware executing corresponding software, or the function may be implemented by a chip. The hardware or the software includes one or more units corresponding to the foregoing function.

According to at least one embodiment, an apparatus is provided. The apparatus has a function of implementing the wireless communication method provided in the second aspect and the possible implementation solutions of the second aspect. The function may be implemented by hardware, or may be implemented by hardware executing corresponding software, or the function may be implemented by a chip. The hardware or the software includes one or more units corresponding to the foregoing function.

According to at least one embodiment, a network side device is provided, where the device includes a processor, a communications interface, and a memory; the communications interface is controlled by the processor; and the processor in the device executes a program or an instruction stored in the memory, to implement the wireless communication method provided in the first aspect and the possible implementation solutions of the first aspect.

According to at least one embodiment, an apparatus is provided, where the apparatus includes a processor, a communications interface, and a memory; the communications interface is controlled by the processor; and the processor in the apparatus executes a program or an instruction stored in the memory, to implement the wireless communication method provided in the second aspect and the possible implementation solutions of the second aspect.

According to at least one embodiment, an embodiment of this application further provides a computer-readable storage medium, where the computer-readable storage medium stores at least one instruction, at least one program, a codeset, or an instruction set, and the at least one instruction, at least one program, the codeset, the instruction set may be executed by a processor, to implement the wireless communication method provided in the first aspect and the possible implementation solutions of the first aspect.

According to at least one embodiment, an embodiment of this application further provides a computer-readable storage medium, where the computer-readable storage medium stores at least one instruction, at least one program, a codeset, or an instruction set, and the at least one instruction, the at least one program, the codeset, or the instruction set may be executed by a processor, to implement the wireless communication method provided in the second aspect and the possible implementation solutions of the second aspect.

BRIEF DESCRIPTION OF DRAWINGS

FIG. 4 shows another wireless communication application scenario according to at least the embodiment shown in FIG. 2;

FIG. 5 shows still another wireless communication application scenario according to at least the embodiment shown in FIG. 2;

DESCRIPTION OF EMBODIMENTS

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

To make the objectives, technical solutions, and advantages of this application clearer, the following further describes the implementations of this application in detail with reference to the accompanying drawings.

Figure 1:
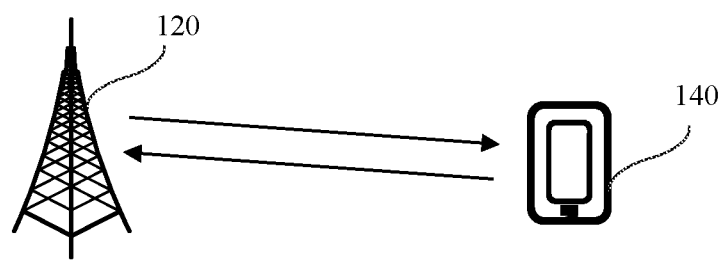
FIG. 1 is an architectural diagram of a wireless communications system according to at least an embodiment of this application.

FIG. 1 is an architectural diagram of a wireless communications system according to an embodiment of this application. The wireless communications system includes a network side device 110 and a user terminal 120.

The wireless communications system may be a cellular mobile communications system. For example, the wireless communications system may be a 3rd generation mobile telecommunications (the 3th generation mobile communication, 3G) system, or may be a 4th generation mobile telecommunications (the 4th generation mobile communication, 4G) system, also referred to as a long term evolution (Long Term Evolution, LTE) system, or the wireless communications system may be a 5G system, also referred to as a new radio (new radio, NR) system. The network side device 110 may be a base station (Base Station, BS) in the 3G system or an evolved base station (eNB) used in the 4G system. Alternatively, the network side device 110 may be a gNB (gNB) that uses a distributed architecture with centralized control in the 5G system. When using a distributed architecture with centralized control, the network side device 110 usually includes a centralized unit (central unit, CU) and at least two distributed units (distributed unit, DU). A protocol stack of a packet data convergence protocol (Packet Data Convergence Protocol, PDCP) layer, a protocol stack of a radio link control protocol (Radio Link Control, RLC) layer, and a protocol stack of a media access control (Media Access Control, MAC) layer are disposed in the centralized unit; and a physical (Physical, PHY) layer protocol stack is disposed in the distributed unit. A specific implementation of the network side device 110 is not limited in this embodiment of this application.

Alternatively, the wireless communications system may be a Bluetooth low energy (Bluetooth Low Energy, BLE) system, the network side device 110 may be a BLE master device, and the user terminal 120 may be a BLE slave device.

Alternatively, the wireless communications system may be a wireless local area network (wireless local area networks, WLAN) system, and the network side device 110 may be an access point (access point, AP) or a transmission reception point (transmission reception point, TRP) in a wireless local area network.

Alternatively, the wireless communications system may be another type of wireless communications system.

The user terminal 120 may be a device that provides voice and/or data connectivity for a user. The user terminal 120 may communicate with one or more core networks through a radio access network (Radio Access Network, RAN). The user terminal 120 may be a mobile terminal, such as a mobile phone (or referred to as a "cellular" phone) and a computer with a mobile terminal, for example, may be a portable, pocket-sized, handheld, computer built-in, or vehicle-mounted mobile apparatus. For example, the user terminal 120 may be a station (Station, STA), a subscriber unit (subscriber unit), a subscriber station (subscriber station), a mobile station (mobile station), a mobile console (mobile), a remote station (remote station), an access point, a remote terminal (remote terminal), an access terminal (access terminal), a user apparatus (user terminal), a user agent (user agent), a user device (user device), or a user terminal (user equipment, UE).

It should be noted that the wireless communications system shown in FIG. 1 may include a plurality of network side devices 110 and/or a plurality of user terminals 120. One network side device 110 and one terminal 120 are shown in FIG. 1 as an example for description. However, this is not limited in this embodiment.

In some embodiments of this application, the network side device 110 may determine at least one first fixed channel from N fixed channels, send a DRS on the first fixed channel, and perform data communication with the user terminal on a data channel other than the N fixed channels. To be specific, in the solution shown in some embodiments of this application, there are a plurality of fixed channels that may be used by the network side device 110 to send a DRS, and the network side device 110 may select one or more fixed channels from the plurality of fixed channels to send a DRS. Compared with a case in which each network side device sends a DRS on only one fixed channel, in a multi-cell scenario, in the solution shown in some embodiments of this application, there are more opportunities for the network side device 110 to send a DRS, so that access efficiency and data transmission efficiency between the user terminal and the network side device are improved, and a system capacity is improved.

In the wireless communications system shown in FIG. 1, the network side device 110 and the user terminal 120 may communicate in an unlicensed spectrum. When communication is performed by using the unlicensed spectrum, to reduce interference between transmitters, before the network side device performs sending, a channel use status needs to be assessed first. A listen before talk (Listen before talk, LBT) technology is a commonly used channel assessment technology. In the following embodiments of this application, the solutions in the embodiments of this application are described by using an example in which the network side device 110 performs LBT before performing sending.

Figure 2:
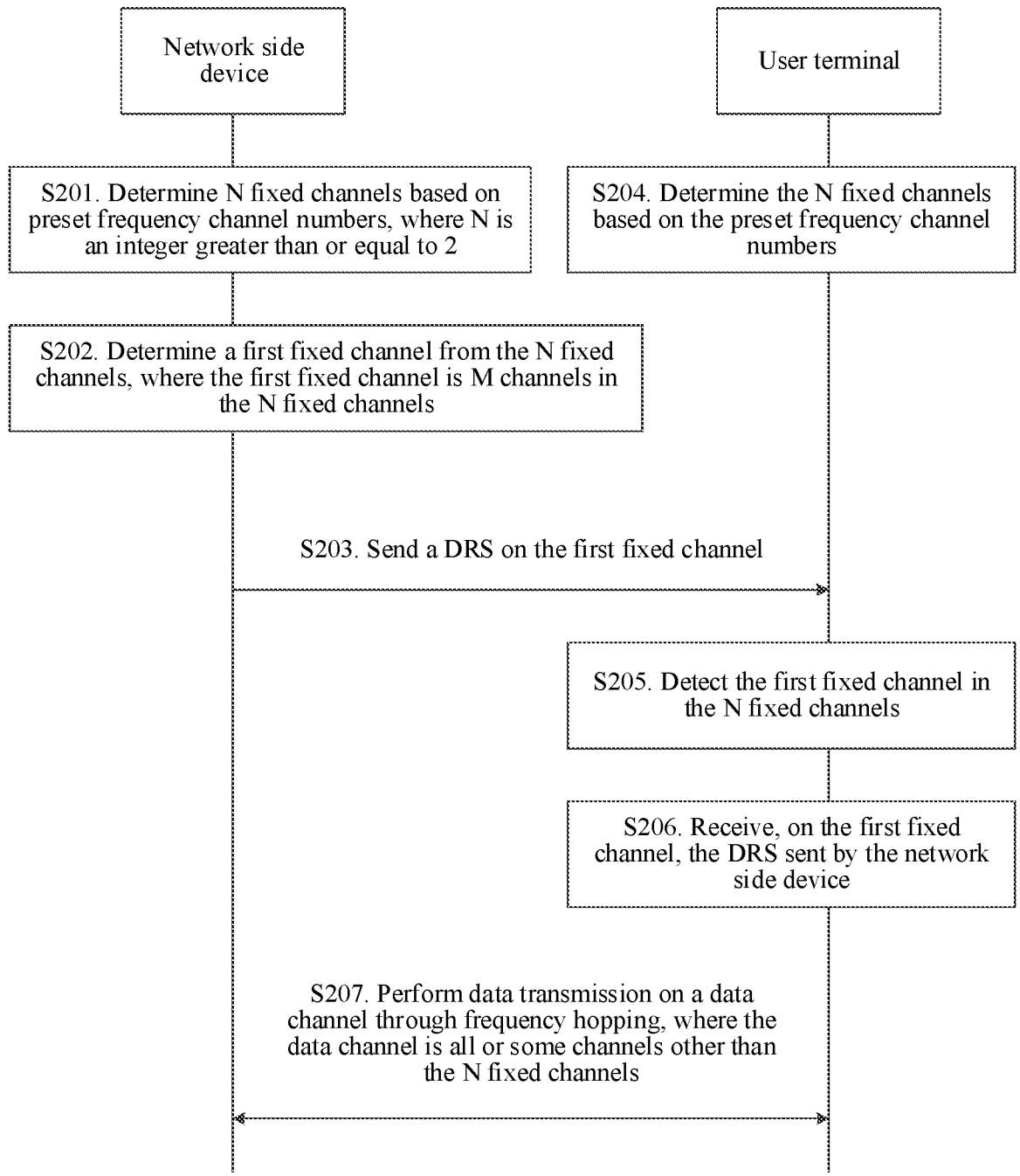
FIG. 2 is a method flowchart of a wireless communication method according to at least an embodiment of this application.

FIG. 2 is a method flowchart of a wireless communication method according to an example embodiment of this application. The foregoing wireless communication method may be performed by the network side device 110 and the user terminal 120 in the wireless communications system shown in FIG. 1, to implement communication on an unlicensed spectrum. As shown in FIG. 2, the wireless communication method may include the following steps.

Step 201: The network side device determines N fixed channels based on preconfigured frequencies, where N is an integer greater than or equal to 2.

In wireless communication, a communications device (for example, the network side device and the user equipment in the embodiments of this application) may determine, by using a preconfigured frequency, a radio channel for receiving and sending a signal. In some embodiments of this application, N frequencies for sending a DRS are preconfigured in the network side device, and each frequency corresponds to one fixed channel. The network side device may determine, based on the N preconfigured frequencies, N fixed channels respectively corresponding to the N frequencies.

The frequency may be preconfigured in the network side device or the user terminal by a wireless communications system by using system signaling. Alternatively, the frequency may be preconfigured in the network side device or the user terminal by development personnel/installation and maintenance personnel. In some embodiments, when the frequency is set by the development personnel/the installation and maintenance personnel, the frequency may be updated in a software upgrade manner.

In some embodiments of this application, N is an integer greater than or equal to 2. To be specific, there are at least two fixed channels pre-allocated by the wireless communications system to each network side device for sending a DRS, and the network side device may send the DRS on two or more fixed channels. A value of N may be 2, 3, or a larger value. This is not limited in this embodiment of this application.

In addition, in some embodiments of this application, the preconfigured frequencies may be neighboring frequencies, that is, the determined N fixed channels are N neighboring radio channels. Alternatively, the preconfigured frequencies may be discrete frequencies, that is, the determined N fixed channels are non-neighboring radio channels. Alternatively, some of the preconfigured frequencies are neighboring frequencies, and the other frequencies are not neighboring to the some frequencies. That is, in the determined N fixed channels, some fixed channels are neighboring, and the other fixed channels are not neighboring to the some fixed channels. For example, it is assumed that N is 3 (that is, there are three fixed channels), two fixed channels may be neighboring, and the other fixed channel is not neighboring to the two fixed channels. Specific frequencies corresponding to the N fixed channels and a relationship between the N fixed channels and the frequencies are not limited in this embodiment of this application.

Step 202: The network side device determines a first fixed channel from the N fixed channels, where the first fixed channel is M channels in the N fixed channels, M≤N, and M is a positive integer.

In some embodiments of this application, after determining the N fixed channels, the network side device may determine the M first fixed channels from the N fixed channels, and use the M first fixed channels as channels for subsequently sending the DRS.

In a possible implementation, the network side device determines the first fixed channel from the N fixed channels based on preconfigured fixed channel configuration information.

The fixed channel configuration information is used to indicate the first fixed channel in the N fixed channels.

To avoid mutual impact between DRS sending processes of neighboring cells, in some embodiments of this application, a specific channel or specific channels in the N fixed channels may be preconfigured for each network side device to be used as the fixed channel or fixed channels for sending the DRS.

Specifically, for example, when installing or maintaining the network side device, installation/maintenance personnel may set fixed channel configuration information in the network side device, where the fixed channel configuration information indicates a specific channel or specific channels in the N fixed channels that is/are the first fixed channel. Alternatively, after the installation of the network side device is completed, the wireless communications system may set the fixed channel configuration information in the network side device.

In another possible implementation, the network side device may determine the first fixed channel from the N fixed channels based on an identifier of a cell corresponding to the network side device.

In some embodiments of this application, the network side device may calculate the first fixed channel based on the identifier (for example, a cell ID) of the cell supported by the network side device.

Specifically, in an example in which one fixed channel is determined from the N fixed channels as the first fixed channel, the cell ID may be a digit, or the cell ID may be converted into a digit by using a specific algorithm. In addition, the network side device may number the N fixed channels starting from 0, that is, numbers of the N fixed channels are respectively 0, 1, . . . , and N-1. The network side device divides a digit corresponding to the cell ID by N, and an obtained remainder is a number of the first fixed channel.

Alternatively, the network side device may determine two or more first fixed channels by using the method. For example, when M≥2, the network side device may determine a channel whose number is the remainder, and determine M-1 channels, which are located before and after the channel, in the N fixed channels as the first fixed channel.

For example, it is assumed that a value of N is 3, that is, there are three fixed channels, and numbers of the three fixed channels are respectively 0, 1, and 2. The network side device needs to determine two fixed channels from the three fixed channels as first fixed channels. The network side device divides a value corresponding to a current cell ID by 3 to obtain a remainder. When the remainder is 1, the network side device may determine the fixed channels numbered 1 and 2 as the first fixed channels, and when the remainder is 2, the network side device may determine the fixed channels numbered 2 and 0 as the first fixed channels.

In another possible implementation, the network side device may alternatively determine all the N fixed channels as the first fixed channels.

Step 203: The network side device sends the DRS on the first fixed channel.

In some embodiments of this application, after determining the first fixed channel, the network side device may send the DRS on the first fixed channel. The DRS may include at least one of a synchronization signal, broadcast information, and a system message.

The synchronization signal may include a primary synchronization signal (Primary Synchronization Signal, PSS), a secondary synchronization signal (secondary Synchronization Signal, SSS), and the like.

The broadcast information may be a SIB-MF-BR message. The SIB-MF-BR message may include a plurality of types of broadcast information by the user terminal, for example, an adaptive frequency hopping pattern (adaptive frequency hopping channel map), frequency hopping time information (used to indicate a time point of frequency hopping), a hyper frame number (hyper SFN), a system message update identifier (system Info Value Tag), and a neighboring cell discovery signals measurement timing configuration (discovery signals measurement timing configuration, DMTC).

The system message may be classified into a master information block (Master Information Block, MIB) and a plurality of system information block (System Information Blocks, SIB) messages.

In some embodiments of this application, in addition to the synchronization signal, the broadcast information, and the system message, the DRS sent by the network side device may further include a physical broadcast channel (Physical Broadcast Channel, PBCH).

When sending the DRS, the network side device may send the DRS on the first fixed channel in one sending time window, where the sending time window is a time interval for sending the DRS.

In some embodiments of this application, when the network side device and the user terminal communicate with each other by using an unlicensed spectrum, the network side device may send the DRS by using an LBT technology. The LBT technology means that before sending a signal or data, a sending device first performs a CCA on a to-be-sent channel, to measure an energy status of a current channel. If energy obtained through measurement exceeds a threshold, it is considered that the channel is occupied. In this case, it is determined that an assessment result is that the channel is not idle (that is, the channel is currently occupied by another sending device). In this case, the channel cannot be sent. On the contrary, if energy obtained through measurement is less than the threshold, it is determined that an assessment result is that the channel is idle (that is, the channel is not currently occupied by another sending device), and the channel may be sent. In this way, time division multiplexing of the channel is implemented between the sending devices, and mutual interference generated due to simultaneous sending is avoided.

Specifically, before sending the DRS, the network side device performs the CCA on the first fixed channel in the foregoing sending time window, and sends the DRS on the first fixed channel when the assessment result of the CCA indicates that the first fixed channel is idle.

In an embodiment of this application, when the network side device communicates with the user terminal, a time for which the network side device sends the DRS and a time for which the network side device performs data transmission with the user terminal are mutually isolated. A continuous time interval in which the network side device is allowed to send the DRS may be referred to as a sending time window. The network side device sends the DRS in each sending time window in an LBT manner, to be specific, in each sending time window, the network side device performs the CCA on each first fixed channel, and when an assessment result of the CCA indicates that a current channel is not occupied, sends the DRS on the first fixed channel in the sending time window.

In some embodiments, the network side device determines the sending time window based on pre-configured time window configuration information or an identifier of a cell that the user terminal accesses.

In a possible implementation, the network side device determines the sending time window based on the preconfigured time window configuration information. The time window configuration information is used to indicate a time interval that is in the first fixed channel and that is for sending the DRS.

Specifically, for example, when installing or maintaining the network side device, installation/maintenance personnel may set time window configuration information in the network side device, where the time window configuration information indicates a specific time interval that is in the first fixed channel and that is for sending the DRS. Alternatively, after installation of the network side device is completed, the wireless communications system may set the time window configuration information in the network side device.

In another possible implementation, the network side device may determine the sending time window based on an identifier of a cell corresponding to the network side device.

Specifically, for example, a cell ID may be a digit, or the cell ID may be converted into a digit by using a specific algorithm. In addition, the network side device may divide a time interval in a channel into several small time intervals, and use the time intervals as several sending time windows to number these sending time windows starting from 0, that is, numbers of the several sending time windows are respectively 0, 1, . . . . The network side device divides a digit corresponding to the cell ID by a quantity of the sending time windows, and an obtained remainder is a number of the sending time window.

In some embodiments of this application, neighboring cells correspond to a same first fixed channel, and the neighboring cells respectively correspond to different sending time windows. Alternatively, neighboring cells respectively correspond to different first fixed channels.

When the neighboring cells correspond to the same first fixed channel, the neighboring cells respectively correspond to different sending time windows. That is, network side devices corresponding to the neighboring cells may send the DRS on the same first fixed channel. However, in this case, the sending time windows corresponding to the different cells need to be time division multiplexed. Alternatively, when a quantity M of first fixed channels corresponding to a cell is less than a quantity N of fixed channels, a network side device corresponding to a neighboring cell may send the DRS on a fixed channel other than the M first fixed channels.

In some embodiments of this application, the network side device may perform the CCA only for one time in one sending time window. In other words, when the assessment result of the CCA is that the current channel is occupied, the network side device no longer attempts to perform the CCA for a next time or sends no DRS in the sending time window.

In another possible implementation, a time length of one sending time window may be greater than a sum of a time length for performing the CCA for one time and a time length for sending the DRS for one time. In other words, the network side device may perform the CCA for a plurality of times in one sending time window.

Specifically, the network side device performs the CCA on the first fixed channel in the sending time window. When an assessment result of the CCA indicates that the first fixed channel is occupied, the network side device calculates a first remaining time length in the sending time window. When the first remaining time length is not less than the sum of the time length for performing the CCA for one time and the time length for sending the DRS for one time, the network side device re-performs the CCA on the first fixed channel. When an assessment result of the re-performed CCA indicates that the first fixed channel is idle, the network side device sends the DRS on the first fixed channel.

In some embodiments of this application, if the terminal performs the CCA for one or more times, and an assessment result each time indicates that the first fixed channel is occupied, if a remaining time length in a current sending time window is still sufficient to perform the CCA for one time and send the DRS for one time, the network side device may continue to perform the CCA. If the CCA succeeds, the network side device sends the DRS, and the network side device repeatedly performs a CCA step until the DRS is successfully sent in the sending time window, or until a remaining time length is insufficient to perform the CCA for one time and send the DRS for one time.

In some embodiments of this application, when $M \geq 2$, to be specific, when the first fixed channel includes two or more fixed channels, the network side device may separately perform LBT on the two or more fixed channels, that is, DRS sending processes on the two or more fixed channels do not affect each other.

Alternatively, in some embodiments of this application, when $M \geq 2$, to be specific, the first fixed channel includes two or more fixed channels, the network side device may send the DRS on only one of the two or more fixed channels, or the network side device sends the DRS on only one of the two or more fixed channels at the same time.

For example, when $M \geq 2$, the network side device simultaneously performs the CCA on the first fixed channel in one sending time window, and the network side device sends the DRS on a second fixed channel in the sending time window, where the second fixed channel is the first channel that obtains an assessment result indicating that the channel is idle and that is in the first fixed channel.

In a possible implementation, when the first fixed channel includes two or more fixed channels, the network side device may simultaneously perform the CCA on the two or more fixed channels in one sending time window. When a fixed channel first obtains an assessment result indicating that the corresponding channel is idle, the network side device sends the DRS on the fixed channel. In addition, for another channel that has not obtained an assessment result yet and that is in the two or more fixed channels, no matter whether an assessment result that is subsequently obtained by the another channel indicates that the corresponding channel is idle, the network side device does not send the DRS on the another channel in the current sending time window.

When M≥2, after sending the DRS on the second fixed channel, the network side device may further calculate a second remaining time length in the sending time window. When the second remaining time length is not less than a sum of a time length for performing the CCA for one time and a time length for sending the DRS for one time, the network side device simultaneously performs the CCA on other channels than the second fixed channel in the first fixed channel.

In another possible implementation, when the first fixed channel includes two or more fixed channels, and when a fixed channel first obtains an assessment result indicating that the corresponding channel is idle, after the network side device sends the DRS on the fixed channel, if a remaining time length in a current time window is still sufficient to perform the CCA and send the DRS for one or more times, the network side device may further continue to perform CCA detection and DRS sending on a channel that has not sent the DRS and that is in the two or more fixed channels, to be specific, the network side device simultaneously performs CCA detection on channels on which no DRS has been sent, and sends the DRS on a channel that is the first channel detected to be unoccupied. The network side device may repeatedly perform the foregoing steps of performing the CCA and sending the DRS, until the DRS is sent on the two or more fixed channels in the current sending time window, or until a remaining time length in the current sending time window is insufficient to perform the CCA for one time and sending the DRS for one time.

For example, the network side device determines three first fixed channels: a channel 0, a channel 1, and a channel 2, a sending time window on each first fixed channel is 10 ms, 1 ms is for performing the CCA for one time, and a time length for sending the DRS is 3 ms. The network side device may simultaneously perform the CCA on the three first fixed channels, and if a result of the CCA indicates that the channel 2 is idle, the DRS is sent on the channel 2. After the sending is completed, a time length of 6 ms remains in the sending time window, which is greater than the sum of the time length for performing the CCA for one time and the time length for sending the DRS for one time, and the network side device may re-perform the CCA on the channel 0 and the channel 1. If a result of the CCA first indicates that the channel 0 is idle, the DRS is sent on the channel 0. In this case, a time length of only 2 ms remains in the sending time window, and is insufficient to perform the CCA for one time and send the DRS for one time. In this case, the CCA is no longer performed and the DRS is no longer sent.

In addition, for a specific sending time window, a time for which the network side device performs the CCA on the first fixed channel for the first time may also be before the sending time window.

In some embodiments, the time length for performing the CCA for one time may be preconfigured by development/operation and maintenance personnel in the network side device, and the time length for sending the DRS may be determined by a length of a time domain occupied by sending the DRS for one time. For example, the time length for sending the DRS may be the length of the time domain occupied by sending the DRS.

Step 204: The user terminal determines the N fixed channels based on the preconfigured frequencies.

The user terminal may determine the N fixed channels based on the preconfigured frequencies when intending to access a network after being started. A manner in which the user terminal determines the N fixed channels is similar to a manner in which the network side device determines the N fixed channels, and details are not described herein again.

Step 205: The user terminal detects the first fixed channel in the N fixed channels.

After determining the N fixed channels, the user terminal detects the first fixed channel in the N fixed channels. The first fixed channel is M channels in the N fixed channels. Specifically, for example, after determining the N fixed channels, a user may detect the DRS on the N fixed channels (for example, may detect the DRS in a blind detection manner) separately. When the user terminal detects, on one or more fixed channels, the DRS sent by the network side device, it may be determined that the one or more fixed channels are the first fixed channels used by the network side device to send the DRS.

Step 206: The user terminal receives, on the first fixed channel, the DRS sent by the network side device.

After the user terminal detects the first fixed channel in the N fixed channels, in a subsequent process of communicating with the network side device, the user terminal detects and receives, on the first fixed channel, the DRS sent by the network side device.

In some embodiments, when M<N, for a third fixed channel in the first fixed channel, when the network side device detects that the third fixed channel is continuously occupied within a predetermined time period, the network side device determines a new first fixed channel in the N fixed channels, where the new first fixed channel does not include the third fixed channel. The network side device may send fixed channel indication information to the user terminal in a current change period or at a start moment of a next change period by using a broadcast channel, and the user terminal receives, in a next change period, the fixed channel indication information sent by the network side device by using the broadcast channel, where the fixed channel indication information is used to indicate a new first fixed channel, and the user terminal receives the DRS on the new first fixed channel.

The change period may be a fixed time interval between two moments at which system information is updated in the communications system.

In some embodiments of this application, after the network side device completely sends the DRS on the first fixed channel, the user terminal needs to first detect the first fixed channel on which the DRS is sent and that is in the determined N fixed channels, and then receive the DRS on the first fixed channel. If M<N, and the network side device detects that a channel in the M first fixed channels is continuously occupied in a predetermined time period (a detection method may be obtaining a quantity of times of obtaining, by the channel in the predetermined time period, a CCA assessment result indicating that the channel is occupied, and if the quantity is greater than a preconfigured threshold, it is considered that the channel is continuously occupied), the network side device may determine the new first fixed channel, and send the fixed channel indication information to the user terminal in the current change period or at the start moment of the next change period by using the broadcast channel, so that the user terminal can receive information about the new first fixed channel in time, and then the user equipment receives the DRS on the new first fixed channel.

A method for determining the new first fixed channel by the network side device may be randomly selecting a new first fixed channel from first fixed channels other than the continuously occupied channel, or may be selecting the first new first fixed channel that is after the continuously occupied channel based on a predetermined sequence. This is not limited in this embodiment of this application.

Step 207: The network side device and the user terminal perform data transmission on a data channel through frequency hopping, where the data channel is all or some channels other than the N fixed channels.

Specifically, the network side device performs, between two consecutive times for sending the DRS, data transmission with the user terminal on p data channels for a predetermined time length for at least one time, where p≥1, and p is an integer. When p is not less than 2, time intervals in which data transmission is performed on the p data channels are different. The DRS further includes data channel configuration information, where the data channel configuration information indicates duration for uplink transmission and duration for downlink transmission that are in each predetermined time length.

In some embodiments, each time before performing data transmission on a first data channel for the predetermined time length, the network side device performs a CCA on the first data channel, where the first data channel is any of the p data channels. If an assessment result of the CCA indicates that the first data channel is idle, the network side device performs data transmission on the first data channel for the predetermined time length.

In some embodiments of this application, after receiving the DRS sent on the first fixed channel by the network side device, the user terminal may perform data transmission with the network side device on the data channel through frequency hopping, where the data channel is all or some channels other than the N fixed channels in all channels.

It should be noted that the N fixed channels and the data channel are all channels in an operating bandwidth of the wireless communications system in which the network side device and the user terminal are located, that is, the data channel is all or some channels other than the N fixed channels in the channels in the operating bandwidth of the wireless communications system.

The network side device and the user terminal may perform, between two consecutive times for sending the DRS, data transmission on at least one data channel for the predetermined time length for at least one time. The predetermined time length is a time length for which the network side device and the user terminal perform one time of continuous data transmission on the data channel, and may be preconfigured by development/operation and maintenance personnel.

When data transmission is performed on two or more data channels, data transmission should be performed on each channel in a time division manner, that is, time intervals are different. The time interval is an interval between a start moment and an end moment of each time of data transmission. In actual application, time lengths of the time intervals are usually the same, but start time points of two time intervals are different. For example, for two neighboring time intervals, an end time point of a previous time interval may be a start time point of a next time interval.

The network side device and the user terminal may perform data transmission for the predetermined time length for one time, or may perform data transmission for the predetermined time length for a plurality of times between two consecutive times for sending the DRS. The predetermined time length may be any time length such as 80 ms or 100 ms, and in the predetermined time length, the duration for uplink transmission and the duration for downlink transmission may be flexibly configured. Configuration information may be included in the DRS, and is used to indicate duration for uplink transmission and duration for downlink transmission for a predetermined time length for one time.

In addition, because a start moment at which the network side device sends the DRS is not fixed, to help the user terminal determine a start moment of data transmission, in a control channel element (Control Channel Element, CCE), the DRS may further include start time offset information, and the start time offset information is used to indicate an offset between a start time point of data transmission between the network side device and the user terminal and any time point of the DRS, where the any time point of the DRS may be a start time point of the DRS, or may be an end time point of the DRS, or may be another time point in the DRS.

When performing data communication with the network side device based on the DRS, the user terminal may calculate a start time point of the data channel based on the start time offset information included in the DRS, calculate a sending frequency of the data channel based on a frequency hopping pattern and frequency hopping time information that are included in the DRS, and determine an uplink/downlink location on the data channel based on the data channel configuration information included in the DRS. Finally, the user terminal performs data transmission with the network side device through frequency hopping based on the start moment, the sending frequency, and the uplink/downlink location of the data channel.

In a data transmission process, a non-adaptive frequency hopping transmission manner may be used for uplink transmission. To be specific, the CCA is not performed at a start location of the uplink transmission, and uplink data is directly sent. A manner of first performing the CCA and then sending the data may be used for downlink transmission. To be specific, the CCA is first performed for one time at a start location of the downlink transmission, and if an assessment result of the CCA indicates that the downlink channel is idle, downlink data is sent, or if the assessment result of the CCA indicates that the downlink channel is occupied, this sending opportunity is abandoned, and arrival of a next sending opportunity is waited for.

Figure 3:
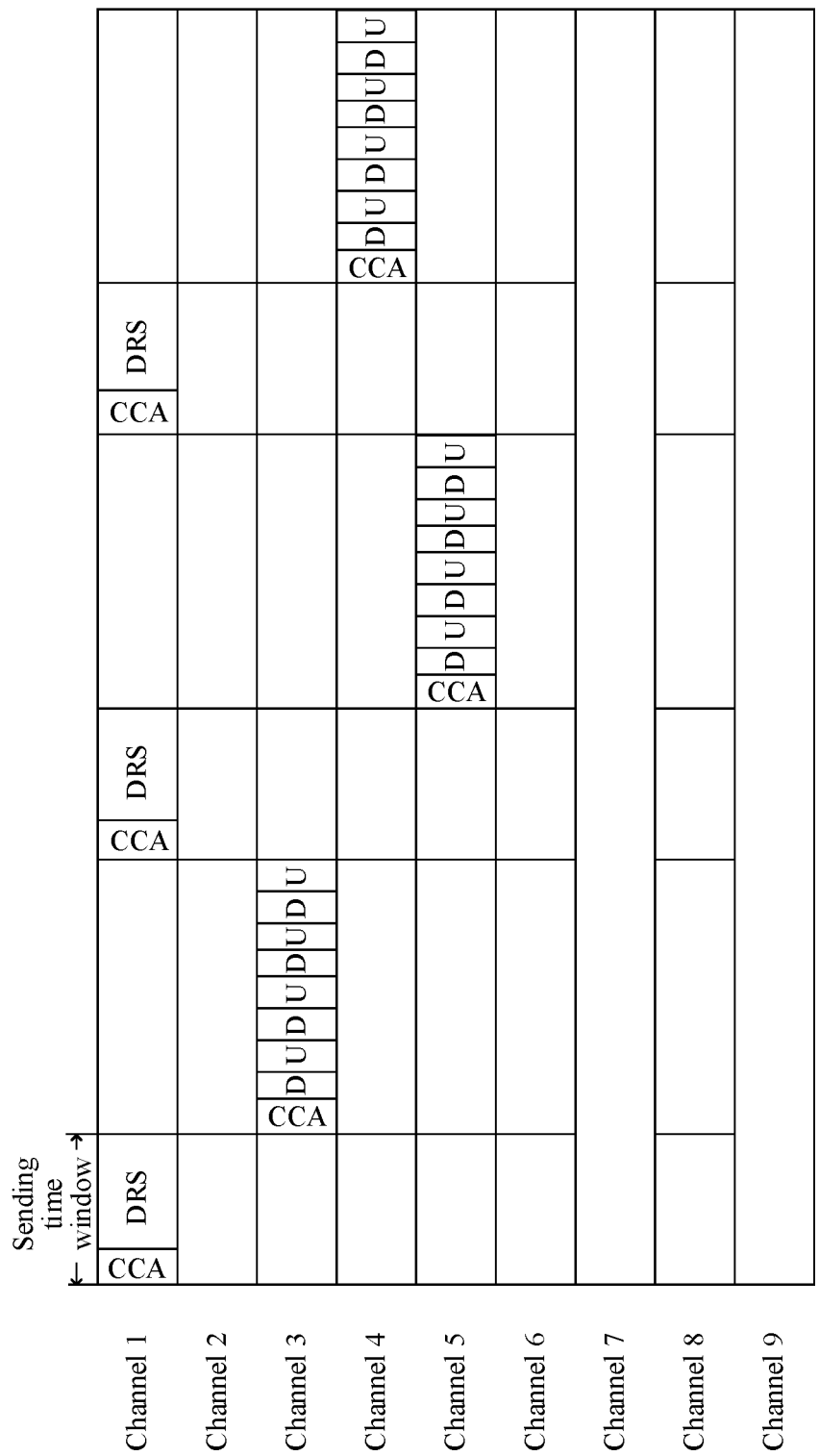
FIG. 3 shows a wireless communication application scenario according to at least the embodiment shown in FIG. 2.

FIG. 3 shows a wireless communication application scenario according to the embodiment shown in FIG. 2. Referring to FIG. 3, in this application scenario, each channel occupies six resource blocks in frequency domain, that is, 1.08 MHz. There are three fixed channels determined by a network side device and a user terminal: a channel 1, a channel 7, and a channel 9. A first fixed channel determined by the network side device from the three fixed channels is the channel 1. A DRS includes a primary synchronization signal, a secondary synchronization signal, a broadcast signal, and broadcast information. In this case, the DRS occupies 4 ms. The channel 1 has a sending time window, a window length is 5 ms, and a time length by the network side device to perform a CCA for one time is 1 ms. The network side device first performs the CCA for one time in the sending time window before sending the DRS. If an assessment result of the CCA indicates that the channel 1 is idle, the network side device sends the DRS on the channel 1 in the sending time window, or if the assessment result of the CCA indicates that the channel 1 is occupied, the network device abandons sending of the DRS in the sending time window, and waits for arrival of a next sending time window. If detecting that the channel 1 is continuously occupied within a predetermined time period, the network side device may determine a new first fixed channel, and notify, through broadcasting before channel switching, the user terminal that the first fixed channel is to be switched. After the user terminal receives the DRS, the network side device performs, between a current sending time window and a next sending time window, data transmission with the user terminal on one data channel (which is shown as a channel 3 in FIG. 3) for a predetermined time length for one time, the network side device and the user terminal hop, between the next time window and a time window after the next time window, to another data channel (which is shown as a channel 5 in FIG. 3) to perform data transmission for the predetermined time length for one time, and so on. That is, sending of the DRS performed by the network side device and data transmission are alternately performed. In FIG. 3, each time before data transmission is performed for the predetermined time length, the network side device performs the CCA for one time. If an assessment result of the CCA indicates that a current data channel is not occupied, data transmission is performed on the current data channel for the predetermined time length for one time. In addition, in each time of data transmission for the predetermined time length shown in FIG. 3, uplink transmission and downlink transmission are alternately performed. For example, the predetermined time length is 80 ms. In FIG. 3, D indicates downlink transmission, and U indicates uplink transmission. A time for each time of uplink transmission and a time for each time of downlink transmission are both 10 ms. The user terminal does not need to perform a CCA before uplink transmission, and directly sends uplink data. It should be noted that, in data transmission for a predetermined time length for one time, a time length for uplink data transmission and a time length for downlink data transmission may be configured by the network side device and sent to the user terminal by using a DRS. For example, a predetermined time length is 80 ms. The network side device may set a time length for downlink transmission to 60 ms, and set a time length for uplink transmission to 20 ms in data transmission for the predetermined time length for one time. A specific time length for uplink data transmission and a specific time length for downlink data transmission are not limited in this embodiment of this application. In addition, a neighboring cell may also use the channel 1 as the first fixed channel at the same time, and sending time windows corresponding to different cells may be time division multiplexed.

FIG. 4 shows another wireless communication application scenario according to the embodiment shown in FIG. 2. Referring to FIG. 4, in this application scenario, each channel occupies one resource block in frequency domain, that is, 180 kHz. There are three fixed channels determined by a network side device and a user terminal: a channel 1, a channel 3, and a channel 5. The network side device determines that all of the three fixed channels are first fixed channels. A DRS occupies 10 ms. The three first fixed channels each have a sending time window, and a window length is 10 ms. Before sending the DRS, the network side device does not need to perform a CCA, and directly sends the DRS. After the user terminal receives the DRS, the network side device performs, between a current sending time window and a next sending time window, data transmission with the user terminal on one data channel (which is shown as a channel 7 in FIG. 4) for a predetermined time length for one time, the network side device and the user terminal hop, between the next time window and a time window after the next time window, to another data channel (which is shown as a channel 9 in FIG. 4) to perform data transmission for the predetermined time length for one time, and so on. That is, sending of the DRS performed by the network side device and data transmission are alternately performed. That the predetermined time length is 90 ms is used as an example. In each time of data transmission for the predetermined time length shown in FIG. 4, an uplink transmission time and a downlink transmission time are both 40 ms. A special subframe S is included between a downlink transmission time D and an uplink transmission time U, and a length is 10 ms. The network side device and the user terminal do not need to perform a CCA before uplink and downlink transmission, and directly send uplink and downlink data. It should be noted that, in data transmission for a predetermined time length for one time, a time length for uplink data transmission and a time length for downlink data transmission may be configured by the network side device and sent to the user terminal by using a DRS. For example, a predetermined time length is 90 ms. The network side device may set a time length for downlink transmission to 60 ms, set a time length for uplink transmission to 20 ms, and set a special subframe to 10 ms in data transmission for the predetermined time length for one time. A specific time length for uplink data transmission, a specific time length for downlink data transmission, and a specific time length for the special subframe are not limited in this embodiment of this application. In addition, broadcast information included in the DRS sent by the network side device carries system time information, and may assist the user terminal in calculating a frequency hopping pattern. Neighboring cells may use a same fixed channel as a first fixed channel, and sending time windows corresponding to different cells may be time division multiplexed. Alternatively, neighboring cells may use different fixed channels as first fixed channels.

FIG. 5 shows still another wireless communication application scenario according to the embodiment shown in FIG. 2. Referring to FIG. 5, in this application scenario, each channel occupies one resource block in frequency domain, that is, 180 kHz. There are three fixed channels determined by a network side device and a user terminal: a channel 1, a channel 2, and a channel 3. The network side device determines that all of the three fixed channels are first fixed channels, and the network side device does not need to perform a CCA before sending a DRS, and directly sends the DRS. After the user terminal receives the DRS, the network side device and the user terminal perform, between a current sending time window and a next sending time window through frequency hopping, data transmission (which is shown as Data in FIG. 5) on a channel 5, a channel 9, a channel 6, a channel 7, and a channel 8 separately for a predetermined time length for one time, the network side device and the user terminal perform, between the next time window and a time window after the next time window through frequency hopping again, data transmission on the channel 5, the channel 9, the channel 6, the channel 7, and the channel 8 for the predetermined time length for one time, and so on. For example, the predetermined time length is 80 ms, and a total time length for data transmission is 400 ms. Each time before data transmission is performed for the predetermined length, the network side device may perform the CCA, or may not perform the CCA (FIG. 4 shows that the network side device does not perform the CCA before each time of data transmission), and directly send uplink and downlink data. In addition, neighboring cells may use a same fixed channel as a first fixed channel, and sending time windows corresponding to different cells may be time division multiplexed. Alternatively, neighboring cells may use different fixed channels as first fixed channels.

Figure 6:
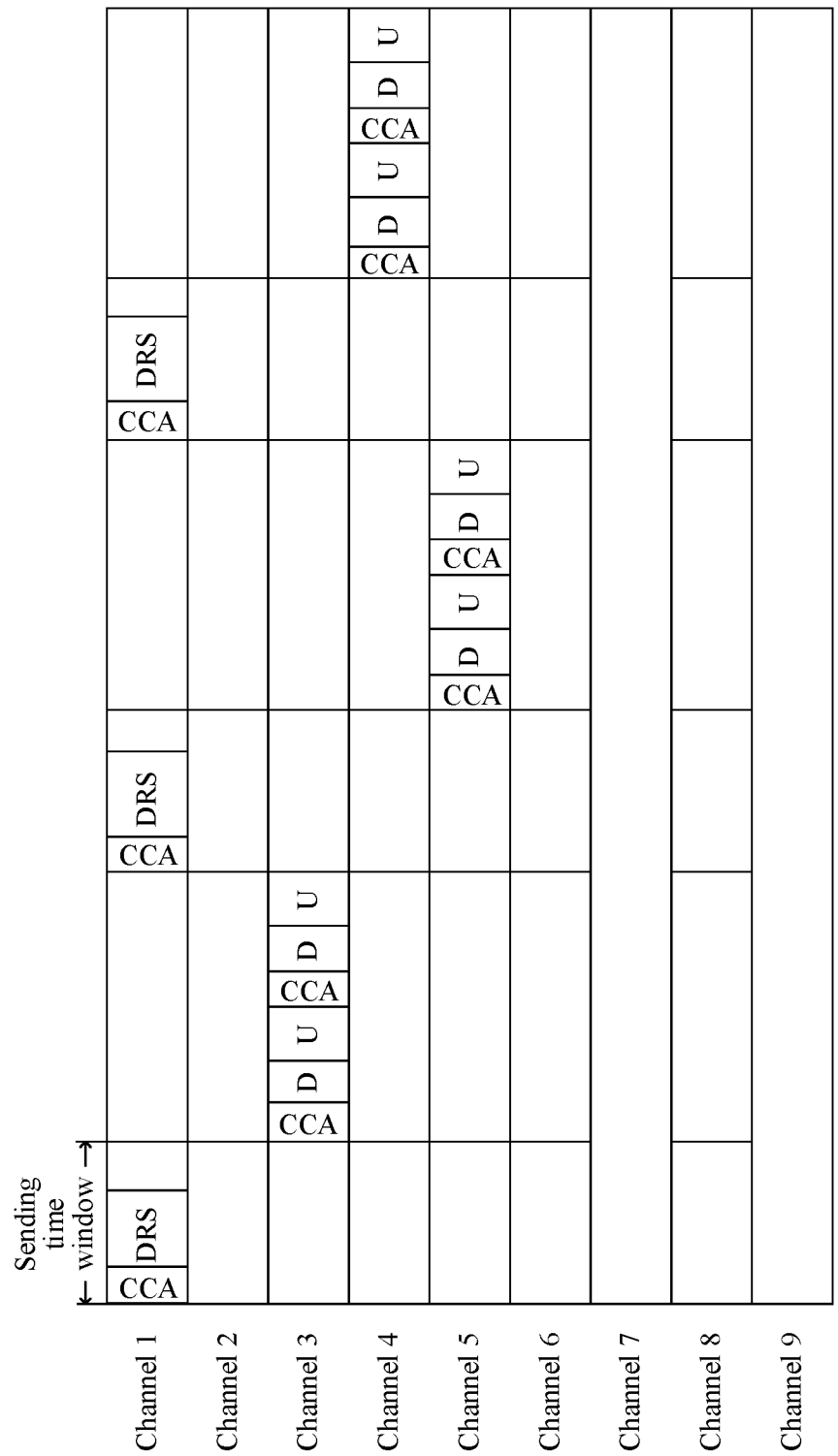
FIG. 6 shows yet another wireless communication application scenario according to at least the embodiment shown in FIG. 2.

FIG. 6 shows yet another wireless communication application scenario according to the embodiment shown in FIG. 2. Referring to FIG. 6, in this application scenario, each channel occupies six resource blocks in frequency domain, that is, 1.08 MHz. There are three fixed channels determined by a network side device and a user terminal: a channel 1, a channel 7, and a channel 9. A first fixed channel determined by the network side device from the three fixed channels is the channel 1. A DRS includes a primary synchronization signal, a secondary synchronization signal, a broadcast signal, and broadcast information, and the broadcast information includes an adaptive frequency hopping pattern, a hyper frame number, a system message update identifier, a neighboring cell discovery signals measurement timing configuration, and the like. In this case, the DRS occupies 3 ms. The channel 1 has a sending time window, a window length is 5 ms, and a time length by the network side device to perform a CCA for one time is 1 ms. That is, the network side device has at most three opportunities of performing the CCA in the sending time window. The network side device first performs the CCA for one time in the sending time window before sending the DRS. If an assessment result of the CCA indicates that the channel 1 is idle, the network side device sends the DRS, or if the assessment result of the CCA indicates that the channel 1 is occupied, the network side device continues to perform the CCA until the three opportunities are used up (to be specific, a remaining time length is insufficient to perform the CCA for one time and send the DRS for one time). If detecting that the channel 1 is continuously occupied within a predetermined time period, the network side device determines a new first fixed channel, and notifies, through broadcasting before channel switching, the user terminal that the first fixed channel is to be switched. The broadcast information included in the DRS further includes start time offset information, used to indicate an offset between a start time point of data transmission performed between the network side device and the user terminal and a start time point of the DRS, to help the user terminal determine a start moment of the data transmission. After the user terminal receives the DRS, the network side device performs, between a current sending time window and a next sending time window, data transmission with the user terminal on one data channel (which is shown as a channel 3 in FIG. 6) for a predetermined time length for at least one time (FIG. 6 shows that the network side device performs, between two sending time windows, data transmission with the user terminal for the predetermined time length for consecutive two times), the network side device and the user terminal hop, between the next time window and a time window after the next time window, to another data channel (which is shown as a channel 5 in FIG. 6) to perform data transmission for the predetermined time length for at least one time, and so on. That is, sending of the DRS performed by the network side device and data transmission are alternately performed. For example, the predetermined time length is 40 ms. The network side device performs data transmission with the user terminal alternately in uplink and downlink. A time for uplink transmission and a time for downlink transmission may be each 20 ms. Each time before data transmission is performed for the predetermined time length, the network side device first performs the CCA for one time. If an assessment result of the CCA indicates that a downlink channel is idle, the network side device and the user terminal perform data transmission. In addition, the user terminal does not need to perform a CCA before uplink transmission, and directly sends uplink data. It should be noted that, in data transmission for a predetermined time length for one time, a time length for uplink data transmission and a time length for downlink data transmission may be configured by the network side device and sent to the user terminal by using a DRS. For example, a predetermined time length is 40 ms. The network side device may set a time length for downlink transmission to 30 ms, and set a time length for uplink transmission to 10 ms in data transmission for the predetermined time length for one time. A specific time length for uplink data transmission and a specific time length for downlink data transmission are not limited in this embodiment of this application. In addition, a neighboring cell may also use the channel 1 as the first fixed channel at the same time, and sending time windows corresponding to different cells may be time division multiplexed.

Figure 7:
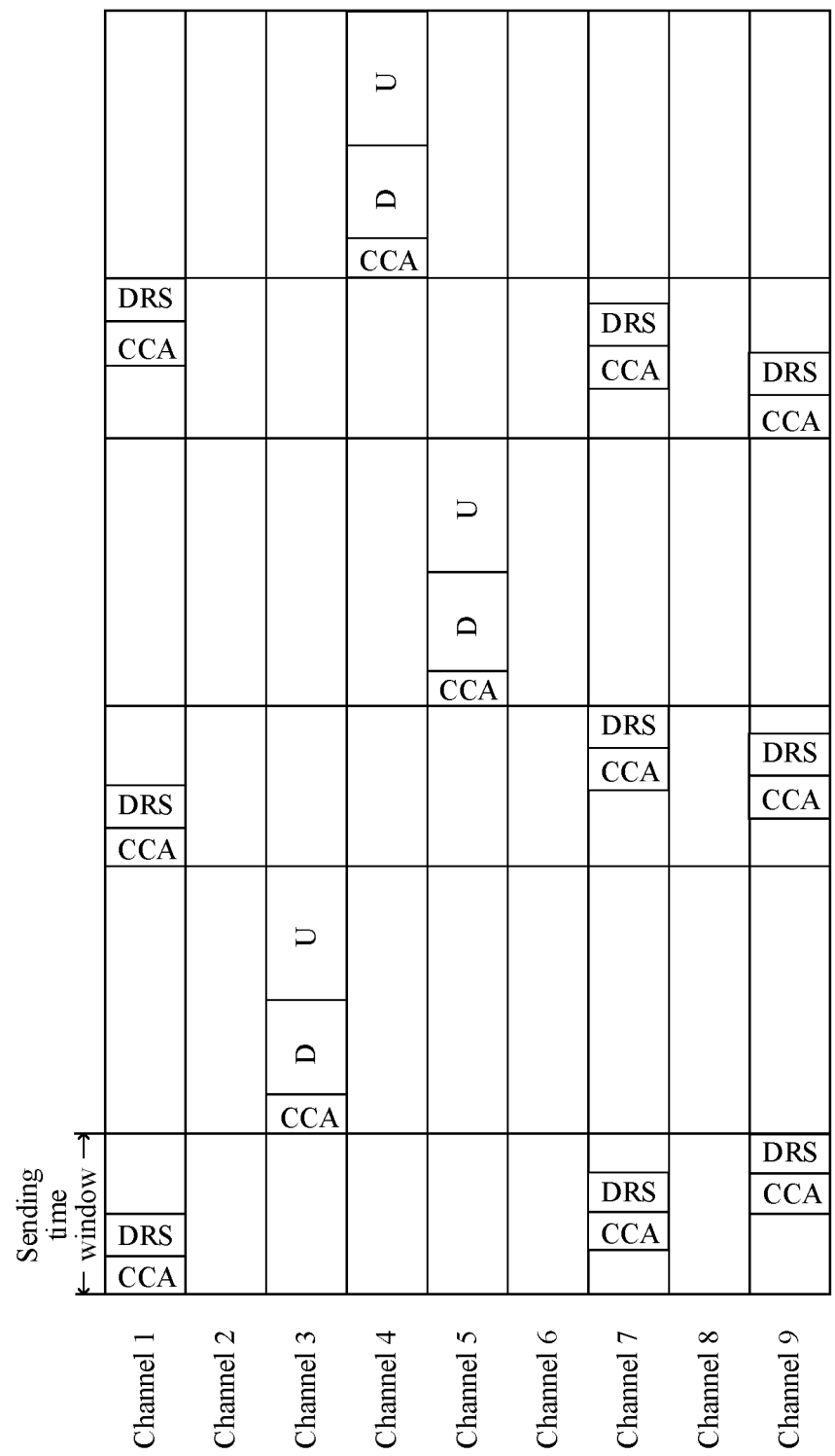
FIG. 7 shows still yet another wireless communication application scenario according to at least the embodiment shown in FIG. 2.

FIG. 7 shows still yet another wireless communication application scenario according to the embodiment shown in FIG. 2. Referring to FIG. 7, in this application scenario, there are three fixed channels determined by a network side device and a user terminal: a channel 1, a channel 7, and a channel 9. The network side device determines that all of the three fixed channels are first fixed channels. A DRS includes only a primary synchronization signal, a secondary synchronization signal, and a broadcast signal. In this case, the DRS occupies 2 ms. The first fixed channel has a sending time window, a window length is 5 ms, and a time length by the network side device to perform a CCA for one time is 1 ms. Before sending the DRS, the network side device first simultaneously performs the CCA on the three first fixed channels at a start moment of the sending time window. If the channel 1 first obtains an assessment result indicating that the channel is idle, the network side device sends the DRS on the channel 1. After the DRS is sent on the channel 1, if a remaining time length of a current sending time window is not less than 3 ms, the network side device simultaneously re-performs the CCA on both the channel 7 and the channel 9. If the channel 7 first obtains an assessment result indicating that the channel is idle, the network side device sends the DRS on the channel 7. After the DRS is sent on the channel 7, if a remaining time length of the current sending time window is not less than 3 ms, the network side device finally performs the CCA on the channel 9, and if an assessment result indicates that the channel 9 is idle, the network side device sends the DRS on the channel 9 again. After the DRS is sent on a fixed channel, if a remaining time length in the current sending time window is less than 3 ms, that is, the remaining time length is insufficient to perform the CCA for one time and sending the DRS for one time, even if there is another fixed channel on which no DRS is sent, the network side device does not perform CCA detection in the current sending time window either. In addition, broadcast information included in the DRS further includes start time offset information, used to indicate an offset between a start time point of data transmission performed between the network side device and the user terminal and a start time point of the DRS, to help the user terminal determine a start moment of the data transmission. After the user terminal receives the DRS, the network side device performs, between a current sending time window and a next sending time window, data transmission with the user terminal on one data channel (which is shown as a channel 3 in FIG. 7) for a predetermined time length for one time, the network side device and the user terminal hop, between the next time window and a time window after the next time window, to another data channel (which is shown as a channel 5 in FIG. 7) to perform data transmission for the predetermined time length for one time, and so on. That is, sending of the DRS performed by the network side device and data transmission are alternately performed. In FIG. 7, each time before data transmission is performed for the predetermined time length, the network side device performs the CCA for one time. If an assessment result of the CCA indicates that a current data channel is not occupied, data transmission is performed on the current data channel for the predetermined time length for one time. In addition, in each time of data transmission for the predetermined time length shown in FIG. 7, uplink transmission and downlink transmission are alternately performed. In addition, when a system is a broadband system, the DRS may be also simultaneously sent on different first fixed channels and time division multiplexing is not required. Neighboring cells may also simultaneously use a same fixed channel as the first fixed channel, and sending time windows corresponding to different cells may be time division multiplexed.

Figure 8:
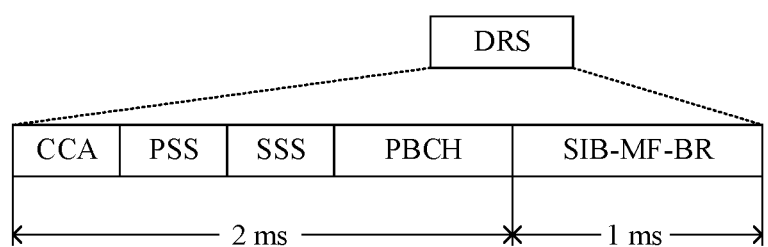
FIG. 8 is a structural diagram of a DRS according to at least the embodiment shown in FIG. 2.

In the foregoing application scenarios, the time for which the network side device performs the CCA is before the start moment at which the DRS is sent. Actually, a time for which the network side device performs the CCA may also be reserved in a time interval of the DRS. FIG. 8 is a structural diagram of a DRS according to the embodiment shown in FIG. 2. Referring to FIG. 8, the DRS in the figure includes a primary synchronization signal PSS, a secondary synchronization signal SSS, a physical broadcast channel PBCH, and broadcast information SIB-MF-BR, and the SIB-MF-BR includes an adaptive frequency hopping pattern, a hyper frame number, a system message update identifier, a neighboring cell discovery signals measurement timing configuration DMTC, and the like. The DRS occupies 3 ms, a reserved time length for performing a CCA, the primary synchronization signal PSS, the secondary synchronization signal SSS, and the physical broadcast channel PBCH occupy 2 ms in total, and the broadcast information SIB-MF-BR occupies 1 ms in total.

In conclusion, according to the method provided in the embodiments of this application, the network side device determines the N fixed channels (where N≥2, and N is an integer) based on the pre-configured frequencies, determines the M first fixed channels from the N fixed channels, sends the DRS on the determined first fixed channels, and performs data transmission with the user terminal on the other data channels than the N fixed channels through frequency hopping. In other words, in the embodiments of this application, a plurality of fixed channels may be used by the network side device to send the DRS, and the network side device may select one or more fixed channels from the plurality of fixed channels to send the DRS. Compared with a case in which all network side devices send a DRS on only one fixed channel, in a multi-cell scenario, according to the solution shown in the embodiments of this application, the network side device 110 has more opportunities of sending the DRS, thereby improving access efficiency of the user terminal to the network side device and data transmission efficiency between the user terminal and the network side device, and improving a system capacity.

Figure 9:
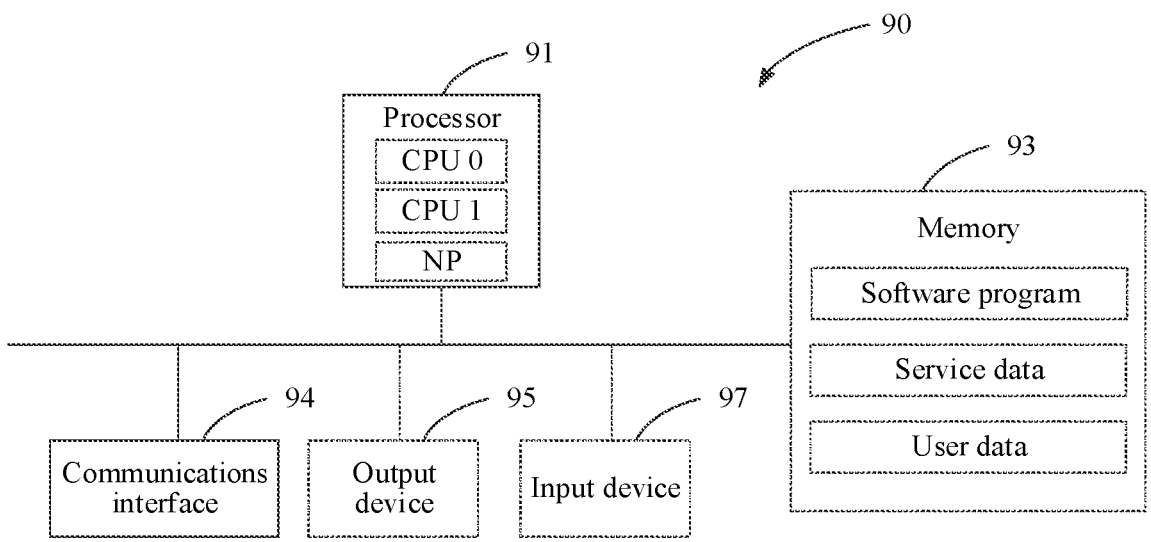
FIG. 9 is a schematic structural diagram of a network side device 90 according to at least an embodiment of this application.

FIG. 9 is a schematic structural diagram of a network side device 90 according to an example embodiment of this application. The network side device 90 may be implemented as the network side device 110 in the system shown in FIG. 1. As shown in FIG. 9, the network side device 90 may include a processor 91 and a communications interface 94.

The processor 91 may include one or more processing units. The processing unit may be a central processing unit (English: central processing unit, CPU), a network processor (English: network processor, NP), or the like.

The communications interface 94 may include a wired communications interface and a wireless communications interface. The wired communications interface is configured to connect to another network entity (for example, a network device in a core network). For example, the network interface may be configured to connect to a serving gateway (Serving Gateway, SGW) or a mobility management entity (Mobility Management Entity, MME). Specifically, the wired communications interface may include an Ethernet interface or a fiber interface. The wireless communications interface is configured to communicate with a user terminal through a wireless air interface, and the wireless communications interface may include a wireless local area network interface, a cellular mobile network interface, a BLE interface, or the like.

In some embodiments, the network side device 90 may further include a memory 93. The memory 93 may be configured to store a software program, and the software program may be executed by the processor 91. In addition, the memory 93 may further store various types of service data or user data. The software program may include a channel determining module and a transceiver module. In some embodiments, the software program may further include a calculation module and a time window determining module.

The channel determining module is executed by the processor 91, to implement a related function of determining, based on the preconfigured frequencies, the N fixed channels, and a function of determining the first fixed channel from the N fixed channels in the embodiment shown in FIG. 2.

The transceiver module is executed by the processor 91 by controlling the communications interface 94, to implement a related function of sending the DRS on the first fixed channel and a function of performing, through frequency hopping, data transmission with the user terminal on the data channel in the embodiment shown in FIG. 2.

The calculation module is executed by the processor 91 by controlling the communications interface 94, to implement a related function of calculating, when the assessment result of the CCA indicates that the first fixed channel is occupied, the first remaining time length in the current sending time window, and a related function of calculating, after the DRS is sent on the second fixed channel, the second remaining time length in the sending time window in the embodiment shown in FIG. 2.

The time window determining module is executed by the processor 91, to implement a related function of determining the sending time window in the embodiment shown in FIG. 2.

In some embodiments, the processor 91 may be connected to the memory 93 and the communications interface 94 by using a bus.

In some embodiments, the network side device 90 may further include an output device 95 and an input device 97. The output device 95 and the input device 97 are connected to the processor 91. The output device 95 may be a display configured to display information, a power amplifier device configured to play a sound, a printer, or the like. The output device 95 may further include an output controller, configured to provide output to the display, the power amplifier device, or the printer. The input device 97 may be a device used by a user to enter information, such as a mouse, a keyboard, an electronic stylus, or a touch control panel. The input device 97 may further include an output controller, configured to receive and process input from the device such as the mouse, the keyboard, the electronic stylus, or the touch control panel.

Figure 10:
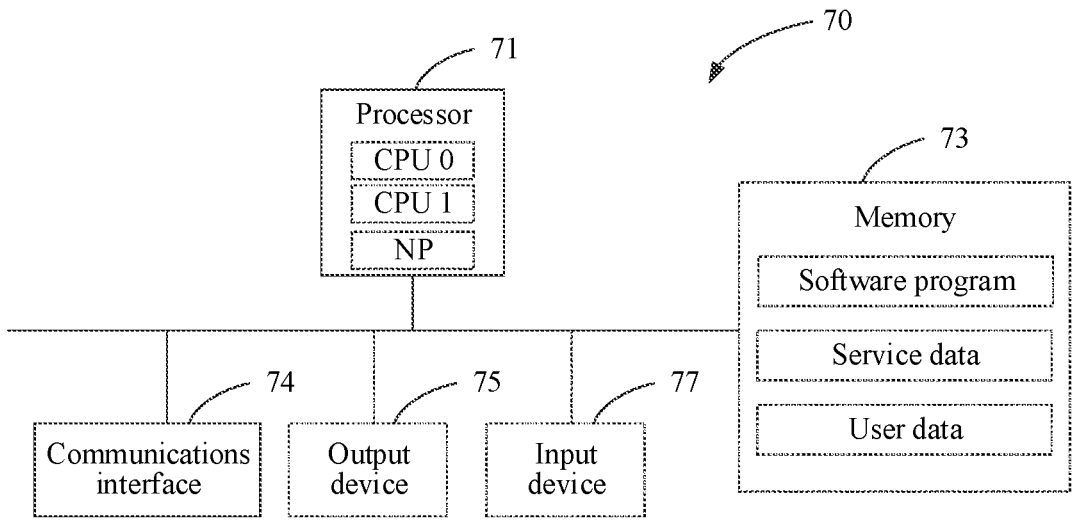
FIG. 10 is a schematic structural diagram of an apparatus 100 according to at least an embodiment of this application.

FIG. 10 is a schematic structural diagram of an apparatus 100 according to an example embodiment of this application. The apparatus 100 may be implemented as the entire user terminal 120 or a part of the user terminal 120 in the system shown in FIG. 1. As shown in FIG. 10, the apparatus 100 may include a processor 1001 and a communications interface 1004.

The processor 1001 may include one or more processing units. The processing unit may be a central processing unit (English: central processing unit, CPU), a network processor (English: network processor, NP), or the like.

The communications interface 1004 may include a wireless communications interface. The wireless communications interface is configured to communicate with a network side device through a wireless air interface, and the wireless communications interface may include a wireless local area network interface, a cellular mobile network interface, a BLE interface, or the like.

In some embodiments, the apparatus 100 may further include a memory 1003. The memory 1003 may be configured to store a software program, and the software program may be executed by the processor 1001. In addition, the memory 1003 may further store various types of service data or user data. The software program may include a channel determining module, a channel detection module, and a transceiver module. In some embodiments, the software program may further include a calculation module and a location determining module.

The channel determining module is executed by the processor 1001, to implement a related function of determining, based on the preconfigured frequencies, the N fixed channels in the embodiment shown in FIG. 2.

The channel detection module is executed by the processor 1001 by controlling the communications interface 1004, to implement a related function of detecting the first fixed channel in the N fixed channels in the embodiment shown in FIG. 2.

The transceiver module is executed by the processor 1001 by controlling the communications interface 1004, to implement a related function of receiving the DRS on the first fixed channel and a function of performing, through frequency hopping, data transmission with the network side device on the data channel in the embodiment shown in FIG. 2.

The calculation module is executed by the processor 1001, to implement a related function of calculating, based on the start time offset information included in the DRS, the start moment of the data channel, and a function of calculating, based on the frequency hopping pattern and the frequency hopping time information that are included in the DRS, the sending frequencies of the data channel in the embodiment shown in FIG. 2.

The location determining module is executed by the processor 1001, to implement a related function of determining, based on the data channel configuration information included in the DRS, an uplink/downlink location on the data channel in the embodiment shown in FIG. 2.

In some embodiments, the processor 1001 may be connected to the memory 1003 and the communications interface 1004 by using a bus.

In some embodiments, the apparatus 100 may further include an output device 1005 and an input device 1007. The output device 1005 and the input device 1007 are connected to the processor 1001. The output device 1005 may be a display configured to display information, a power amplifier device configured to play a sound, a printer, or the like. The output device 1005 may further include an output controller, configured to provide output to the display, the power amplifier device, or the printer. The input device 1007 may be a device used by a user to enter information, such as a mouse, a keyboard, an electronic stylus, or a touch control panel. The input device 1007 may further include an output controller, configured to receive and process input from the device such as the mouse, the keyboard, the electronic stylus, or the touch control panel.

The following are apparatus embodiments of this application, and the apparatus embodiments may be used to execute the method embodiment of this application. For details not disclosed in the apparatus embodiment of this application, refer to the method embodiment of this application.

Figure 11:
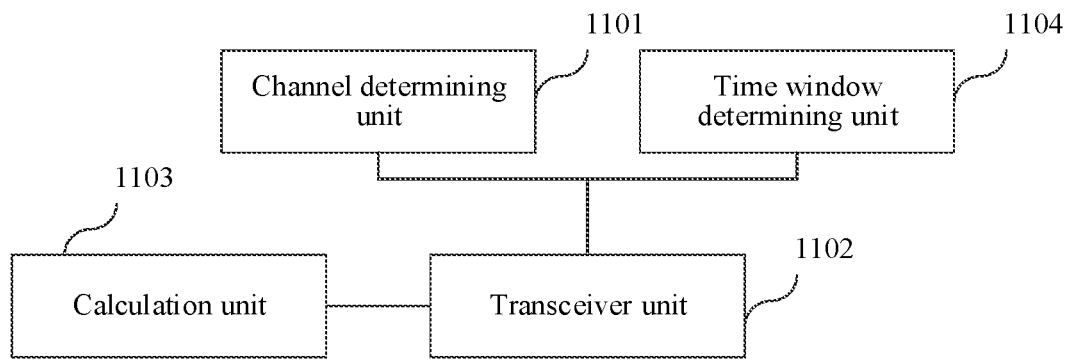
FIG. 11 is a structural block diagram of a communications apparatus according to at least an embodiment of this application.

FIG. 11 is a structural block diagram of a communications apparatus according to an example embodiment of this application. The communications apparatus may be implemented as a part of a network side device or an entire network side device by using a hardware circuit or a combination of software and hardware, and the network side device may be the network side device 110 in the embodiment shown in FIG. 1. The communications apparatus may include a channel determining unit 1101, a transceiver unit 1102, a calculation unit 1103, and a time window determining unit 1104.

The channel determining unit 1101 is executed by the processor, to implement a related function of determining, based on the preconfigured frequencies, the N fixed channels and a function of determining the first fixed channel from the N fixed channels in the embodiment shown in FIG. 2.

The transceiver unit is executed by the processor by controlling the communications interface, to implement a related function of sending the DRS on the first fixed channel and a function of performing, through frequency hopping, data transmission with the user terminal on the data channel in the embodiment shown in FIG. 2.

The calculation unit 1103 is executed by the processor by controlling the communications interface, to implement a related function of calculating, when the assessment result of the CCA indicates that the first fixed channel is occupied, the first remaining time length in the current sending time window, and a related function of calculating, after the DRS is sent on the second fixed channel, the second remaining time length in the sending time window in the embodiment shown in FIG. 2.

The time window determining unit 1104 is executed by the processor, to implement a related function of determining the sending time window in the embodiment shown in FIG. 2.

In some embodiments, functions implemented by using the foregoing units may also be implemented by using a chip.

Figure 12:
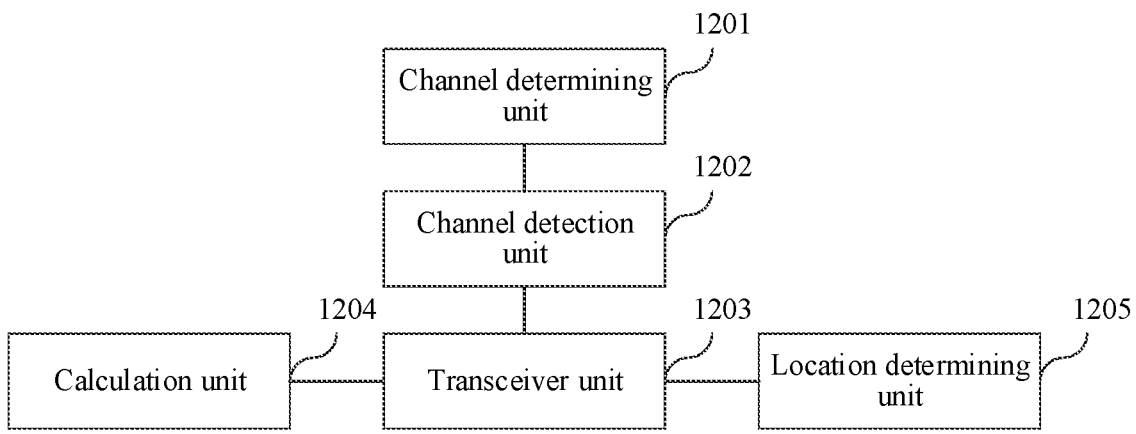
FIG. 12 is a structural block diagram of another apparatus according to at least an embodiment of this application.

FIG. 12 is a structural block diagram of another apparatus according to an example embodiment of this application. The apparatus may be implemented as a part of a user terminal or an entire user terminal by using a hardware circuit or a combination of software and hardware. The user terminal may be the user terminal 120 in the embodiment shown in FIG. 1. The apparatus may include a channel determining unit 1201, a channel detection unit 1202, a transceiver unit 1203, a calculation unit 1204, and a location determining unit 1205.

The channel determining unit 1201 is executed by the processor, to implement a related function of determining, based on the preconfigured frequencies, the N fixed channels in the embodiment shown in FIG. 2.

The channel detection unit 1202 is executed by the processor by controlling the communications interface, to implement a related function of detecting the first fixed channel in the N fixed channels in the embodiment shown in FIG. 2.

The transceiver unit 1203 is executed by the processor by controlling the communications interface, to implement a related function of receiving the DRS on the first fixed channel and a function of performing, through frequency hopping, data transmission with the network side device on the data channel in the embodiment shown in FIG. 2.

The calculation unit 1204 is executed by the processor, to implement a related function of calculating, based on the start time offset information included in the DRS, the start moment of the data channel, and a function of calculating, based on the frequency hopping pattern and the frequency hopping time information that are included in the DRS, the sending frequencies of the data channel in the embodiment shown in FIG. 2.

The location determining unit 1205 is executed by the processor, to implement a related function of determining, based on the data channel configuration information included in the DRS, an uplink/downlink location on the data channel in the embodiment shown in FIG. 2.

In some embodiments, functions implemented by using the foregoing units may also be implemented by using a chip.

It should be noted that when the communications apparatus/apparatus provided in the foregoing embodiment performs DRS sending and data communication, division of the foregoing function modules is used only as an example for illustration. In actual application, the foregoing functions may be allocated to different function modules and implemented based on a requirement, that is, an inner structure of a device/terminal is divided into different function modules to implement all or some of the functions described above. In addition, the communications apparatus/apparatus provided in the foregoing embodiment and the method embodiment of the wireless communication method pertain to a same concept. For a specific implementation process, refer to the method embodiment, and details are not described herein again.

In addition, an embodiment of this application further provides a computer-readable storage medium. The computer-readable storage medium stores at least one instruction, at least one program, a codeset, or an instruction set. The at least one instruction, the at least one program, the codeset, or the instruction set may be executed by a processor of a network side device, to complete all or some of the steps performed by the network side device in the wireless communication method shown in the embodiments in this application. Alternatively, the at least one instruction, the at least one program, the codeset, or the instruction set may be executed by a processor of a user terminal, to complete all or some of the steps performed by the user terminal in the wireless communication method shown in the embodiments in this application.

The computer-readable storage medium may be a ROM, a random access memory (RAM), a CD-ROM, a magnetic tape, a floppy disk, an optical data storage device, or the like.

Sequence numbers of the foregoing embodiments of this application are merely for description, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An apparatus, comprising:
one or more processors; and
a non-transitory memory for storing computer instructions that when executed by the one or more processors cause the apparatus to perform operations of:
determining N fixed channels, wherein N is an integer greater than or equal to 2;
determining a first fixed channel from the N fixed channels, wherein the first fixed channel is M channels in the N fixed channels, M≤N, and M is a positive integer;
sending a discovery reference signal (DRS) on the first fixed channel, wherein the DRS comprises at least one of a synchronization signal, a broadcast information, or a system message; and
performing, through frequency hopping, data transmission on a data channel, wherein the data channel includes a channel other than the N fixed channels;
wherein before sending the DRS on the first fixed channel, the operations further comprise:
performing a clear channel assessment (CCA) on the first fixed channel in one sending time window; and
re-performing the CCA on the first fixed channel in response to a first remaining time length not being less than a sum of a time length for performing the CCA for one time and a time length for sending the DRS for the one time.

2. The apparatus according to claim 1, wherein performing, through frequency hopping, the data transmission on the data channel comprises:
performing, between two consecutive times for sending the DRS, data transmission on p data channels for a predetermined time length for at least one time, wherein p≥1, and p is an integer.

3. The apparatus according to claim 2, wherein time intervals in which the data transmission is performed on the p data channels are different in response to p being not less than 2.

4. The apparatus according to claim 1, wherein sending the discovery reference signal (DRS) is sent on the first fixed channel, comprises:
sending the DRS on the first fixed channel in the one sending time window, wherein the one sending time window is a time interval for sending the DRS.

5. The apparatus according to claim 4, wherein before sending the DRS on the first fixed channel in the one sending time window, the operations further comprises:
calculating the first remaining time length in the one sending time window in response to an assessment result of the CCA indicating that the first fixed channel is occupied; and sending the DRS on the first fixed channel in response to the DRS being sent on the first fixed channel in the one sending time window, and an assessment result of the re-performed CCA that indicates that the first fixed channel is idle.

6. The apparatus according to claim 1, wherein before sending the discovery reference signal DRS on the first fixed channel, the operations further comprises:
  determining a sending time window based on a pre-configured time window configuration information, or
  determining the sending time window based on an identifier of a cell accessed by a user terminal.

7. The apparatus according to claim 1, wherein determining the first fixed channel from the N fixed channels, comprises:
  determining the first fixed channel from the N fixed channels based on a preconfigured fixed channel configuration information, or
  determining the first fixed channel from the N fixed channels based on an identifier of a cell accessed by a user terminal.

8. The apparatus according to claim 1, wherein sending the discovery reference signal (DRS) on the first fixed channel,
  the DRS further comprises a data channel configuration information on the first fixed channel, wherein the data channel configuration information indicates a predetermined duration for uplink transmission, and a predetermined duration for downlink transmission.

9. The apparatus according to claim 1, wherein the data channel further includes a plurality of channels, and each of the plurality of channels corresponds to channels other than the N fixed channels.

10. An apparatus, comprising:
  one or more processors; and
  a non-transitory memory for storing computer instructions that when executed by the one or more processors cause the apparatus to perform operations of:
    determining N fixed channels, wherein N is an integer greater than or equal to 2;
    detecting a first fixed channel in the N fixed channels, wherein the first fixed channel is M channels in the N fixed channels, M≤N, and M is a positive integer;
    receiving a discovery reference signal (DRS) on the first fixed channel, wherein the DRS comprises at least one of a synchronization signal, a broadcast information, or a system message; and
    performing, through frequency hopping, data transmission on a data channel, wherein the data channel includes at least a channel other than the N fixed channels, wherein performing, through frequency hopping, the data transmission on the data channel, comprises:
      determining a start moment of the data channel based on a start time offset information included in the DRS, wherein the start time offset information indicates an offset between a start time point of the data transmission and a start time point of the DRS or an end time point of the DRS.

11. The apparatus according to claim 10, wherein performing, through frequency hopping, the data transmission on the data channel, further comprises:
  determining a sending frequency of the data channel based on a frequency hopping pattern and a frequency hopping time information that are included in the DRS;
  determining an uplink location or a downlink location of the data channel based on a data channel configuration information included in the DRS, wherein the data channel configuration information indicates a predetermined duration for uplink transmission and a predetermined duration for downlink transmission; and
  performing, through frequency hopping, data transmission.

12. A wireless communication method, wherein the method comprises:
  determining, by a network side device, N fixed channels, wherein N is an integer greater than or equal to 2;
  determining, by the network side device, a first fixed channel from the N fixed channels, wherein the first fixed channel is M channels in the N fixed channels, M≤N, and M is a positive integer;
  sending, by the network side device, a discovery reference signal (DRS) on the first fixed channel, wherein the DRS comprises at least one of a synchronization signal, a broadcast information, or a system message; and
  performing, by the network side device, data transmission on a data channel through frequency hopping, wherein the data channel includes a channel other than the N fixed channels,
  wherein before sending the DRS on the first fixed channel, the method further comprising:
    performing a clear channel assessment (CCA) on the first fixed channel in one sending time window; and
    re-performing the CCA on the first fixed channel in response to a first remaining time length not being less than a sum of a time length for performing the CCA for one time and a time length for sending the DRS for the one time.

13. The method according to claim 12, wherein the performing, by the network side device, the data transmission on the data channel through frequency hopping comprises:
  performing, by the network side device, between two consecutive times for sending the DRS, data transmission on p data channels for a predetermined time length for at least one time, wherein p≥1, and p is an integer.

14. The method according to claim 13, wherein the performing, by the network side device, the data transmission on the data channel through frequency hopping, wherein time intervals in which data transmission is performed on the p data channels are different in response to p being not less than 2.

15. The method according to claim 12, wherein the sending, by the network side device, the DRS on the first fixed channel comprises:
  sending, by the network side device, the DRS on the first fixed channel in the one sending time window, wherein the one sending time window is a time interval for sending the DRS.

16. The method according to claim 15, wherein before the sending, by the network side device, the DRS on the first fixed channel in the one sending time window, the method further comprises:
  determining, by the network side device, the first remaining time length in the one sending time window in response to an assessment result of the CCA indicating that the first fixed channel is occupied; and
  the sending, by the network side device, the DRS on the first fixed channel in the one sending time window comprises:
    sending, by the network side device, the DRS on the first fixed channel in response to an assessment result of the re-performed CCA that indicates that the first fixed channel is idle.

17. The method according to claim 12, wherein before the sending, by the network side device, the DRS on the first fixed channel, the method further comprises:
- determining, by the network side device, a sending time window based on a pre-configured time window configuration information, or
- determining, by the network side device, the sending time window based on an identifier of a cell accessed by a user terminal.

18. The method according to claim 12, wherein the determining, by the network side device, the first fixed channel from the N fixed channels comprises:
- determining, by the network side device, the first fixed channel from the N fixed channels based on a preconfigured fixed channel configuration information, or
- determining, by the network side device, the first fixed channel from the N fixed channels based on an identifier of a cell accessed by a user terminal.

19. The method according to claim 12, wherein the sending, by the network side device, the DRS on the first fixed channel the DRS further comprises a data channel configuration information on the first fixed channel, wherein the data channel configuration information indicates a predetermined duration for uplink transmission and a predetermined duration for downlink transmission.

20. The method according to claim 12, wherein the data channel further includes a plurality of channels, and each of the plurality of channels corresponds to channels other than the N fixed channels.

* * * * *